(12) United States Patent
Ye et al.

(10) Patent No.: US 8,707,111 B2
(45) Date of Patent: Apr. 22, 2014

(54) HIGH-VOLUME DISTRIBUTED SCRIPT ERROR HANDLING

(75) Inventors: Eric Ye, Saratoga, CA (US); David Q. He, Cupertino, CA (US); Rajasekhar Bhogi, San Jose, CA (US)

(73) Assignee: eBay Inc., San Jose, CA (US)

(*) Notice: Subject to any disclaimer, the term of this patent is extended or adjusted under 35 U.S.C. 154(b) by 677 days.

(21) Appl. No.: 13/024,142

(22) Filed: Feb. 9, 2011

(65) Prior Publication Data

US 2012/0204068 A1 Aug. 9, 2012

(51) Int. Cl.
*G06F 11/00* (2006.01)

(52) U.S. Cl.
USPC .............................. 714/57; 714/48

(58) Field of Classification Search
USPC .................................... 714/57, 48
See application file for complete search history.

(56) References Cited

U.S. PATENT DOCUMENTS

| | | | |
|---|---|---|---|
| 2002/0184575 A1* | 12/2002 | Landan | 714/47 |
| 2008/0008097 A1* | 1/2008 | Avadhanam | 370/235 |
| 2008/0097830 A1* | 4/2008 | Kim | 705/10 |
| 2008/0141066 A1* | 6/2008 | Wood et al. | 714/4 |
| 2008/0208610 A1* | 8/2008 | Thomas et al. | 705/1 |
| 2008/0320343 A1* | 12/2008 | Eickmeyer et al. | 714/57 |
| 2009/0271514 A1* | 10/2009 | Thomas et al. | 709/224 |
| 2009/0300709 A1* | 12/2009 | Chen et al. | 726/1 |
| 2010/0169457 A1* | 7/2010 | Kinoshita et al. | 709/219 |
| 2010/0218053 A1* | 8/2010 | Eickmeyer et al. | 714/57 |
| 2011/0107147 A1* | 5/2011 | Kesireddy | 714/33 |
| 2011/0119375 A1* | 5/2011 | Beeco et al. | 709/224 |
| 2011/0276843 A1* | 11/2011 | Echevarria et al. | 714/55 |

* cited by examiner

*Primary Examiner* — Loan L. T. Truong

(74) *Attorney, Agent, or Firm* — Schwegman, Lundberg & Woessner, P.A.

(57) ABSTRACT

Various embodiments include a method and system for high-volume distributed script error report handling. A group of user terminals may be selected to report errors, where the group of user terminals is a subset of user terminals having open user session and the group of user terminals is smaller than a predetermined threshold value. An error report, generated by a user terminal in response to a script error, may then be received, where the user terminal is in the group of user terminals selected to report errors. The received error report may then be processed to create a processed error report. The processed error report may then be presented to a service user.

19 Claims, 7 Drawing Sheets log msg=2010-08-07 10:02:31,715 ERROR - CheckoutSuccess(js-err-line-20-msg-attributes.url value' is null or not an object)

Context={
  Request Id: sr-v3sem006/10.10.173.35:782b28e4:12a4d7f476f:-6c40
  Request: http://www.foo.com:80/ws/web/SojPagePerf?cmdname=CheckoutSuccess&st1=128120054699958&st1a=141&siid=gOSpDyY*&ctb=234&ctrgv
  =1512|5|1528|2558&ctrc=1544&ctr21=280&ex3
  Command Name: SojPagePerf
  User-Agent: Mozilla/4.0 (compatible; MSIE 7.0; Windows NT 6.0; Trident/4.0; GTB6.5; SLCC1; .NET CLR 2.0.50727; Media Center PC 5.0; .NET CLR
  1.1.4322; .NET CLR 3.5.30729; .NET CLR 3.0.30729)
  Referer: https://payments.foo.com/ws/FooISAPI.dll?CheckoutSuccess&cartid=15647686019
  Remote Address: 76.29.229.136
  Secure Connection: fals
  Auth Type: null
  Query Parameters:
  ex3="5484"
  ctrc="1544"
  cxy="0|823|17"
  cmdname="CheckoutSuccess"
  sgbid="1"

Fig. 6

HIGH-VOLUME DISTRIBUTED SCRIPT ERROR HANDLING

TECHNICAL FIELD

This document pertains generally to data processing techniques, and more particularly, but not by way of limitation, to handling high-volume error reports from distributed scripts.

BACKGROUND

Modern companies often distribute information and applications to many users over the internet using standard technologies such as Hypertext Markup Language (HTML). The users, in turn, use web browsers ("browser") at a user terminal to receive and render the HTML to view the information or interact with the application. Companies often distribute scripts with HTML to add flexibility and customizability to the generally static HTML. These scripts are typically run within a browser using a script engine and, in combination with HTML, cause a browser to display content to be displayed on a user terminal (e.g., a computer monitor or smartphone screen) and, in some cases, to also manipulate and transmit data back to the content provider. Combining scripts with HTML may allow delivery of a richer user experience beyond what is typically possible with HTML alone.

Users typically have the option of selecting one of many available web browsers. Script engines within the browsers may also be varied because browser manufacturers may develop their own engine, or employ one of several pre-developed script engines. Often, because companies may not impose a particular browser or script engine on users, companies attempt to distribute HTML and scripts to provide an acceptable user experience regardless of the particular browser or script engine employed by the client user; i.e., the HTML and scripts are designed to work with a number of different browser and script engine configurations. Typically, script error detection is performed via in-house testing of the scripts prior to distributing the scripts to users or by error reports or surveys completed by the users themselves.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 illustrates an example formatted error report according to one embodiment.

DETAILED DESCRIPTION

Figure 1:
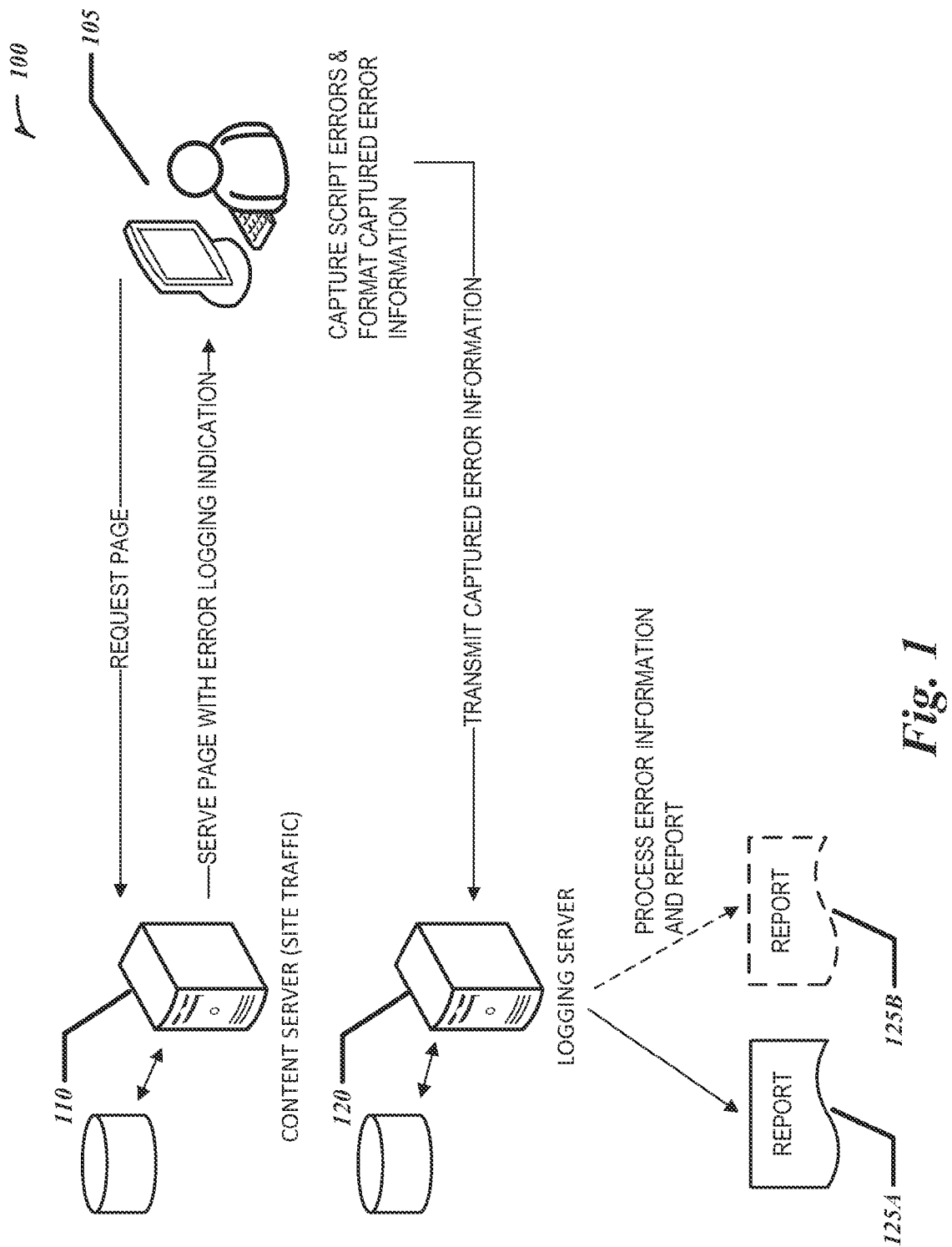
FIG. 1 illustrates a high-level view of an example system for high-volume distributed script error handling according to one embodiment.

Companies that distribute content online, which may be known as content providers, often serve content to a large number of users at any given time. Not only is the number of users large, but often the number of user operating environments (e.g., computer hardware; operating system, browser, etc.) at a user terminal is also large. Providing an attractive and productive user experience is often a goal of these content providers because it increases product adoption by the users as well as revenue. Often, programs (e.g., scripts) are distributed with the content and run on the user's terminal to facilitate the user experience, as well as other provider goals (e.g., usage monitoring, intellectual property safeguarding, etc.). Ensuring the smooth operation of these distributed programs is an important concern for content providers.

In-house testing of the distributed programs is often inadequate to ensure that the program properly supports the desired level of user experience, or other content provider objective, of the distributed program while running on a given user terminal. Reasons fir this may, for example, include: an unknown configuration for the user terminal; a bug, or defect, in the user terminal operating environment; or unanticipated user interaction with the program. To complicate matters, the distributed programs are often scripts, which tend to be interpreted rather than compiled—errors which may be discovered when a program is compiled are often discovered when an interpreted program is run at the user terminal—and the programs are often distributed to large numbers of users at a time. Due to the typically varied nature of user terminal configurations, it may be difficult for a provider to completely test the distributed programs before they are distributed to users.

In order to help ensure a good and consistent user experience, defects in the distributed programs should be identified and corrected as early in the process as possible. However, due to the varied nature of user terminal configurations, some defects may only be discovered once a program is running on the user terminal. Capturing errors within the distributed program and providing error reports of those errors to an error facility of the content provider may provide an effective solution to the problem. The error repots may include information on both the nature of the error as well as the user terminal's operating environment. However, if the content provider has many simultaneous users (e.g., millions), having every user terminal provide error reports may quickly overwhelm the error facility, create an undue burden on the content provider's computer resources, or even impact the primary goal of distributing content.

To deal with the problem of high-volume distributed error reporting, the error facility may select a group of user terminals from those user terminals currently requesting content (e.g., having open user sessions) to report errors where the group is smaller than a threshold value. Controlling the size of the potential error reports that may be simultaneously received allows a high-volume content provider to continue to make use of error reports generated at the user terminal without undue impact on the content provider's business. Further, to help ensure that most errors are caught, the group of user terminals may be chosen to include representative user terminal environments using statistical sampling methods. The error facility may designate user terminals to report errors at the time a program is distributed to the user. By restricting the number of user terminals that provide error reports, the content provider may exert control over the computing resources used to receive error reports while still allowing for timely and accurate reporting of errors. Also, by statistical sampling methods to select the group of user terminals to report error, the content provider may receive some assurance that a variety of the different user terminal environments may report errors and thus distributed program problems may be quickly identified across the user base of the content provider. The error facility may further process error reports, such as determining equivalence between received error reports and possibly aggregating equivalent error reports. Equivalence may be based on one or more measures within the error reports, such as error type or user terminal browser type. Processing error reports may reduce data irrelevant or redundant data) to streamline further operations.

Quickly solving the identified distributed program problems is also an important concern for content providers. To this end, a presentation facility of the content provider may present the processed error reports to a service user of the content provider. Presenting the error reports may include displaying a graphical user interface with cues to the service user, such as a plot of error reports over time, to allow the service user to quickly determine the nature and severity (e.g., number of users impacted) of errors in distributed programs. A real-time visual representation of received error reports may be a solution for a content provider presented with a question of where and when development resources should be used to maximize their effectiveness. For example, if a small percentage of users are reporting a particular error, but the vast majority of users are operating without a problem, a content provider may not wish to devote many development resources to solving the particular problem at that time. Further, an interface may be provided which allows a quick overall view of error reports as well as the ability to drill down into a given error report, thus providing decision makers with important data on where and when to apply development resources.

Presenting the error reports may alternatively, or also, include creating a bug report, or entry into an error report database. Upon their creation, bug reports may be assigned to the developer or development group responsible for solving the error. Assignment may be facilitated by tagging the distributed programs with developer, or development group, information to trace responsibility for a given distributed program or portion of a distributed program. Also, by extracting user terminal environment details from an error report or a bug report, a testing environment may be automatically created that reflects the environment in which the error was produced. For example, the testing environment may be created with the version of a particular operating system (e.g., Microsoft® Windows® 7), browser (e.g., Firefox® 3.6), and possibly other factors (e.g., browser plug-ins). Thus, the assignment of an error may be automated, and moreover the environment in which to observe and test the solution for the error may also be automatically created. By using such automation, the content provider may be able to quickly tackle and solve errors in distributed programs and thus enhance the users' experience.

Methods and systems for high-volume distributed script error handling are herein described. In the following description, for purposes of explanation, numerous specific details are set forth in order to provide a thorough understanding of the various aspects of different embodiments of the present subject matter. It will be evident, however, to one skilled in the art, that the present subject matter may be practiced without these specific details.

FIG. 1 illustrates a high-level view of an example system 100 for high-volume distributed script error handling according to one embodiment. System 100 may include a user terminal 105, a content sever 110 to handle site traffic and distribute content, and a logging server 120. The content server 110 and the logging server 120 may each comprise one or more application servers. Each content server 110 and togging server 120 may be communicatively coupled to one or more databases. System 100 may also comprise an error report 125A and optionally one or more additional error reports 125B.

The user terminal 105 may request content (e.g., a web page) from the content servers 110. The content servers 110 may, in response to the request, serve the content to the user terminal 105. In some examples, the content may include a distributed program in some examples, the distributed program may include an indication that it is to report errors back to the content provider. It will be understood that the distributed program is merely a computer program distributed, for example, across a network to one or more user terminals 105. In some examples the distributed program is written in a script language (e.g., JavaScript®) and embedded within a content document (e.g., an HTML web page). However, it will be understood that the distributed program could include other programming languages and technologies, such as Java (e.g., Java® Applets, or Java® "Web Start" application), or other compiled or scripted programming languages.

User terminal 105 may run the distributed program after receiving the content and capture errors (e.g., distributed program script errors). The user terminal 105 may then format the captured error information and transmit it to the logging servers 120. In some examples the logging serves 120 and the content server 110 may be on separate machines, as illustrated in FIG. 1. In some examples, the logging servers 120 and the content servers 110 may be on the same machine. In some examples, a cloud, or many machines, may be used to support either, or both, the operations of the content servers 110 and the logging servers 120. It will be understood that several different machine configurations are contemplated to support the operations of the content servers 110 and the logging servers 120.

Logging servers 120 may receive and process the error information captured at the user terminal 105. In some examples the logging servers 120 may include software or hardware modules to also present the processed error information in the form of one or more error reports 125A and optional error reports 125B to a service user of the content provider. In some examples, the error reports 125A may be displayed graphically to the service user. In some examples, error reports 125A may be presented as bug reports or in the automated creation of testing environments for testing the errors by developers. In some examples, error reports 125A may be presented via an error reporting server (not shown), the error reporting server being hardware or software in addition to the logging servers 120.

Figure 2:
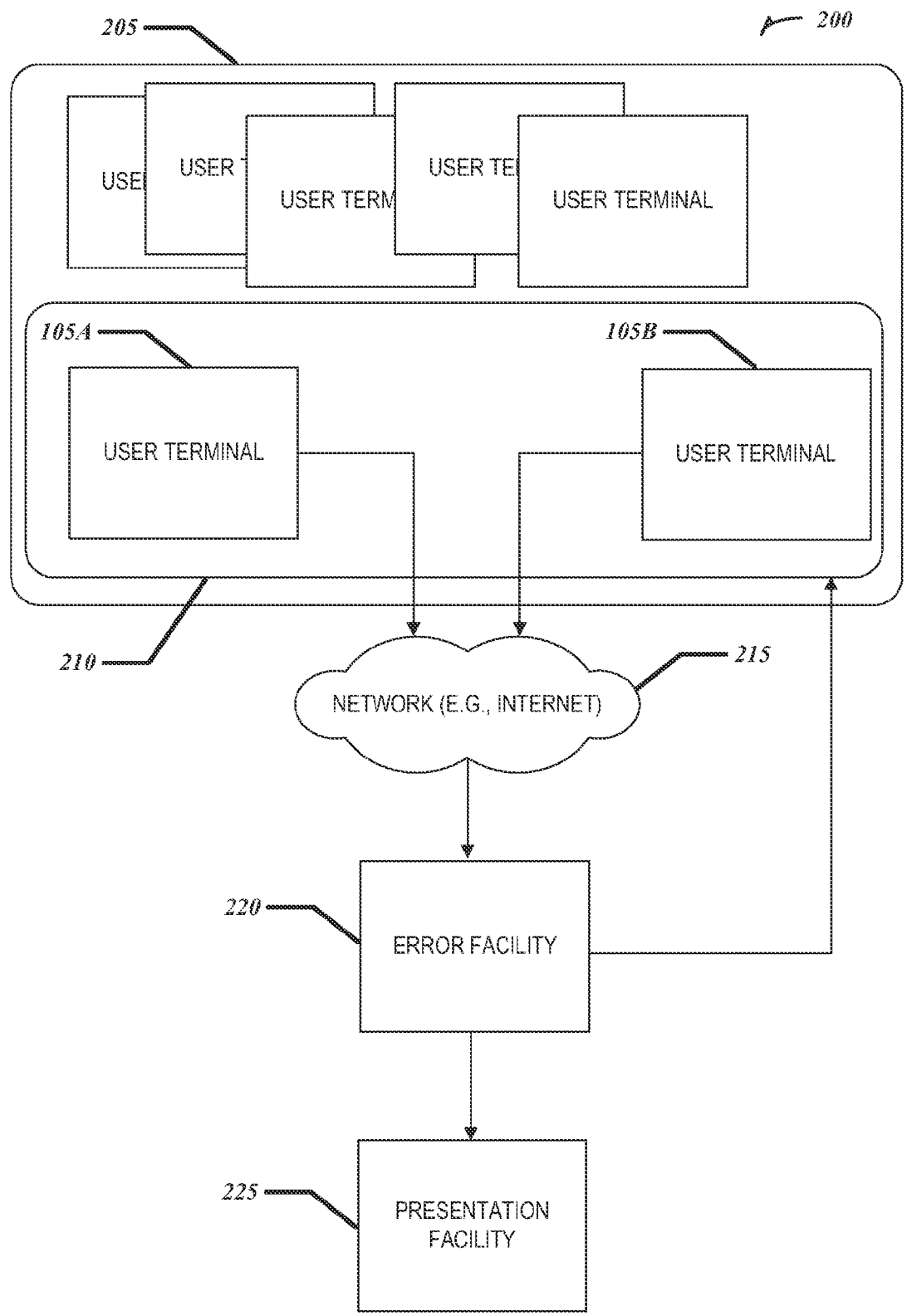
FIG. 2 is a block diagram illustrating an example system including various functional components or modules according to one embodiment.

FIG. 2 is a block diagram illustrating an example system 200 including various functional components or modules according to one embodiment. System 200 may include user terminals with open user sessions 205 (e.g., are actively requesting content as shown in FIG. 1), a group of user terminals 210 which are a subset of the user terminals with open user sessions 205, a network 215 (e.g., the interne), an error facility 220 communicatively coupled to the group of user terminals 210 via the network 215 and also communicatively coupled to a presentation facility 225. In some examples, the error facility 220 may reside on one or more computer systems, such as one or both of the content server 110 and the logging server 120 of FIG. 1.

The error facility 220 may be configured to select the group of user terminals 210 to report errors, the group of user terminals 210 being a subset of user terminals with open user sessions 205 and smaller than a predetermined threshold value. The predetermined threshold may be set such that the available computing resource to receive error reports may simultaneously receive a number of error reports equal to the predetermined threshold. In other words, the predetermined threshold defines the maximum number of error reports that can be simultaneously received. In some examples, the group of user terminals 210 may include at least one user terminal 105A. In some examples, the group of user terminals 210 may include two or more user terminals 105A and 105B. In some examples, inclusion in the group of user terminals 210 does not require a user terminal 105A to transmit an error report 125 unless an error is actually generated at the user terminal 105A. In other words, being included in the group of user terminals 210 merely enables the ability of a user terminal 105A to transmit an error report 125. In some examples, selecting the group of user terminals 210 may optionally include choosing representative user terminal environments from the user terminals having open user sessions 205 using statistical sampling methods.

In some examples, using statistical sampling methods may include selecting the group of user terminals 210 to be a statistical sample. A statistical sample will be understood as a subset of a population (e.g., user terminals with open user sessions 205) to make predictions about the population based on statistical inference. Statistical sampling methods may inform one or both of the size of the sample for a given population and the manner in which members of the sample are chosen. For example, members (e.g., user terminals with open user sessions 205) of the statistical sample may be randomly chosen until the subset cardinality reaches a value (e.g., four hundred if the members number more than ten thousand) for a given desired confidence level (e.g., 95%) of the prediction or inference (e.g., that each type of user terminal is selected). It will be understood, however, that any number of common statistical sampling methods may be utilized to inform the error facility both in the size of the group of user terminals 210 as well as the specific user terminals 105A and 105B selected to be in the group of user terminals 210. In some examples, if the statistical sample size to achieve a desired confidence level is smaller than the predetermined threshold value, the group of user terminals 210 may have cardinality equal to the statistical sample size and smaller than the predetermined threshold value. In some examples, if the statistical sample size is greater than the predetermined threshold for a given confidence level, the group of user terminals 210 will not exceed the predetermined threshold value and a new confidence level may be calculated based on the reduced size of the statistical sample. This may allow a content provider to predict future expansion needs in error reporting infrastructure in order to maintain broad awareness of user terminal problems across different operating environments.

In some examples, the error facility may be communicatively coupled to, or reside on, the content servers 110 in order to receive information about the user terminals with open user sessions 205. In some examples, the decision to include a given user terminal 105A may be, in part, based on information in an open user session for user terminal 105A. For example, user terminal 105A may be associated with an open user session that has been open for a very long time, or associated with a group of interest (e.g., Linux users), or on another measure of interest which may be identified by information in an open user session.

The error facility 220 may also be configured to receive an error report 125 generated by the user terminal 105A or 105B in response to a distributed program (e.g., script) error. In some examples, the error report 125 may be formatted by the user terminal 105A before it is transmitted to the error facility 220. An example of a formatted error report 125 is discussed in greater detail below with respect to FIGS. 5 and 6. In some examples, the error report 125 may include any one, or all, of a description of the error in the distributed program, the operating environment of the user terminal 105A, and the developers or development group responsible for programming all or part of the distributed program that caused the error or from which the error originated.

Error facility 220 may process the error report 125 to create a processed error report. Processing the error report 125 may involve transforming the digital representation of the error report 125 in a computer memory, on a display, or on a storage device (e.g., a hard disk). In some examples, processing the error report 125 may include adding information associated with the error report 125 and unavailable to the user terminal 105A. For example, the added information may include details from the open user session, the machine which received the error report 125, and processing timelines after the error report 125 was received, among other pieces of information. In some examples, a processed error report is identical to the error report 125 before processing. In some examples, processing the error report 125 may include identifying equivalent error reports. In some examples, equivalence is equality between two error reports in at least one measure. For example, if two error reports are associated with the same script error, even though the corresponding user terminals 105A and 105B are each running a different operating system, the two error reports may be equivalent. In some examples, two or more measures may be used to determine equivalence between error reports. In some examples, equivalent error reports may be aggregated to create aggregated error reports. In some examples, creating aggregated error reports leaves constituent error reports 125 intact (i.e., the error reports 125 are not destroyed or modified) and the aggregated error reports are associated with, or include, the constituent error reports 125. In some examples, the aggregated error reports replace the received error reports 125.

Presentation facility 225 may be configured to present the processed error report to a service user. A service user may be an employee of the content provider, or a non-employee (e.g., contractor or employee of another organization) handling some or all of the content provider's response to an error report 125. In some examples, presenting the processed error report to the service user may include displaying a real-time graphical representation of the aggregated error report. Example graphical user interfaces to represent the aggregated error report are discussed in greater detail below with respect to FIGS. 3 and 4.

In some examples, presenting the processed error report to the service user may include creating an entry into an error database (a "bug report") for the error report 125. In some examples, the entry into the error database may include an assignment to a developer to correct the error associated with the error report 125. For example, when a processed error report is received, a bug report may be generated and assigned to a particular developer or development group. The bug report may include information relevant to a developer in solving the problem, such as user terminal environment information, date and time of the error, the content being accessed at the time of the error, and the error itself. In some examples, the distributed program may include embedded information identifying the developer, or group of developers, responsible for programming one or more parts of the distributed program. In some examples, the content provider may maintain information identifying a responsible developer or development group. In some examples, the developer or development group may not have originally developed the failing distributed program, but my be assigned to correct the error based on other criteria, such as being a part of a specialized bug fixing team. It is contemplated that there are a number of ways to assign the developer to the bug report based on information in the error report 125. In some examples, after the bug report has been created, a message may be communicated to a developer, a group of developers, or a coordinator indicating the presence of a new bug.

In some examples, presenting the processed error report to the service user may include an automated creation of a computing environment corresponding to the user's terminal 1054. For example, the presentation facility 225 may extract user terminal 1054 environment information, such as the operating system and browser used by the user terminal 1054. The presentation facility 225 may then attempt to locate a testing environment (e.g., a computer, virtual machine, etc.) which closely corresponds to the user terminal's 105A environment. The presentation facility 225 may then reserve the testing environment and notify a developer that it is prepared to be used to solve the error. In some examples, the content provider may maintain a library of software and hardware components which may be used for the testing environment. In some examples, the presentation facility 225 may use the library to create a testing environment, by, for example, directing the instantiation of a virtual machine with the operating system and browser, taken from the library, that most closely correspond to those in the error report 125. In some examples, the presentation facility 225 may also create a testing plan based on the processed error report as well as content provider policy or procedure documents accessible to the presentation facility 225.

Providing a streamlined remote error capture process which controls the number of error reports 125 received may allow a content provider to get real-time feedback from its users while still controlling costs and ancillary negative effects (e.g., interruption of primary service) due to the possibly large number of users who may report errors. Further, by using statistical sampling methods to select the group of user terminals to report errors, the content provider may help ensure that a greater cross section of user terminal environments report errors so that problems with different user terminal environments may be quickly discovered. Once errors are discovered, automatically funneling the error reports 125 to developers may help the content provider to quickly reduce the impact on end users of distributed programming errors. The quick identification of errors, combined with automated tools to speed fixes, helps content providers meet the goat of maintaining a high quality user experience.

Figures 3, 4:
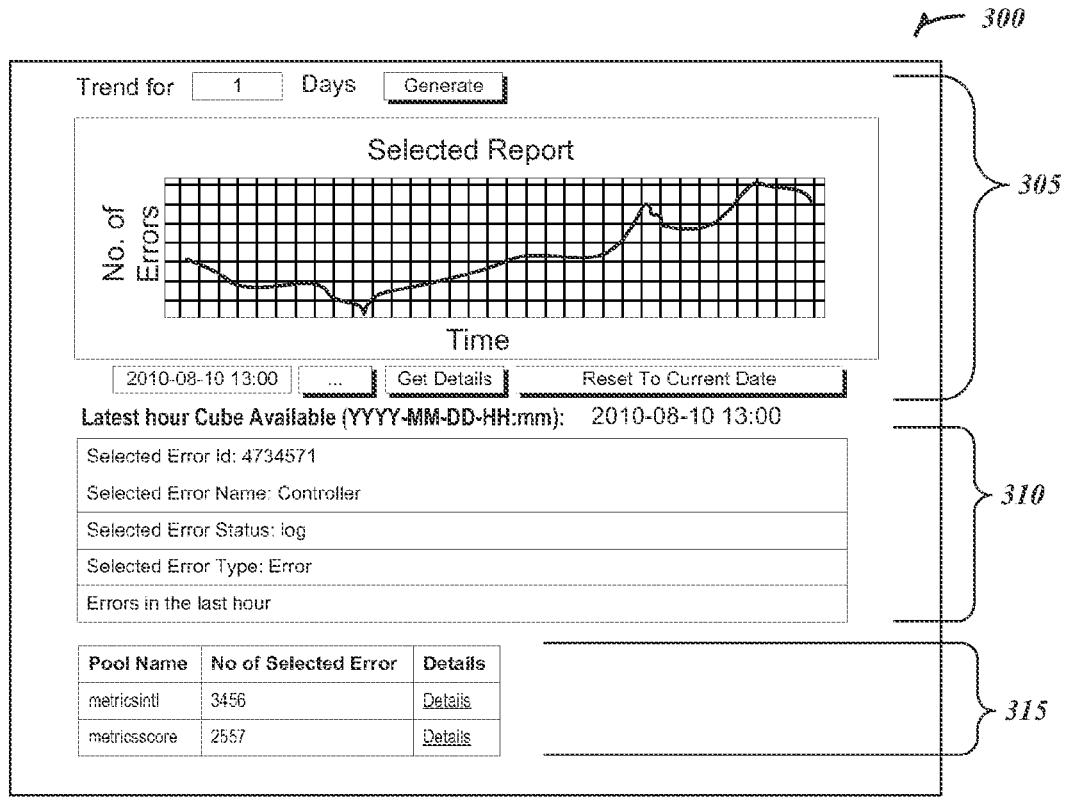
FIG. 3 illustrates an example user interface with a graphical representation of an error report according to one embodiment.
FIG. 4 illustrates an example user interface of an error report, according to one embodiment.

FIG. 3 illustrates an example user interface 300 with a graphical representation of an error report 125 according to one embodiment. As discussed above, the presentation facility 225 may provide such a graphical representation when presenting a processed, or aggregated, error report to a service user. User interface 300 may include a plot 305 of an aggregated error report. The plot 305 may be real-time or may include controls to define a period over which aggregated error report data is plotted. In some examples, an alarm threshold may be set such that the plot 305, or other indication (e.g., a sound or visual alert), is communicated to service users when the number of errors in an aggregated error report exceeds the alarm threshold. In some examples, the plot 305 may change colors, or comprise different colors, based on one or more of the rate of errors reported or the total number of errors reported, for example, in a defined period of time. Service users may be able to use the graphical representation of aggregated error reports to quickly identify problems (e.g., a large number of distributed program errors) which may need immediate attention.

User interface 300 may also include aggregated error report details 310. The aggregated error report details 310 may include, for example, an error ID, an error name, an error status, an error type, and a number of errors reported within a preceding time period e.g., an hour). This may provide the service user with a context in which to read the plot 305. It is contemplated that other aggregated error report details 310 may also be displayed.

User interface 300 may include additional, or supplemental, information 315 to aid a service user in interpreting the plot 305. For example, a pool of aggregated error reports may be identified, along with error counts belonging to the pool, and a user interface element to get further details about a given pool. In some examples, a pool may be a group of servers, or services. Providing the supplemental information 315 may allow a service user to determine the impact of the error shown in plot 305 to the pool which is affected by the error. For example, if the number of errors in the aggregated error report is small compared to the number of errors in the pool, the error shown in plot 305 may be a lower priority than other errors affecting a given pool. The service user may then prioritize the development resources to correct other errors before the one currently being shown in the plot 305.

FIG. 4 illustrates an example user interface 400 of an error report 125 according to one embodiment. Specifically, user interface 400 may be the detailed view shown after selecting a "Details" user input element from, for example, the supplemental information 315 of user interface 300. User interface 400 may be arranged in a tree structure (as shown) and include an aggregation of metrics 405 at the top, with group metric aggregations 410 and individual error metrics 415 in deeper branches and leaves of the tree. In some examples, other user interfaces may be used to represent a hierarchy of detail which may allow a service user to "drill down" into the data. For example, a services pool, "metricsscore" may show a large number of Standard Query Language ("SQL") errors for the total number of SQL requests. A service user may expand the pool and took at the constituent elements of the pool and see, as shown in FIG. 4, that "E663_core_9876" has the greatest number of SQL failures (although not the greatest percentage given the SQL requests). The service user may then expand E663_core_9876 to observe the individual errors for that constituent component of pool metricsscore. Thus, the service user may not be overwhelmed by details until they can identify problem areas and investigate further. In some examples, the presentation facility 225 may provide similar drill down user interfaces for other elements of aggregate error reports.

Figure 5:
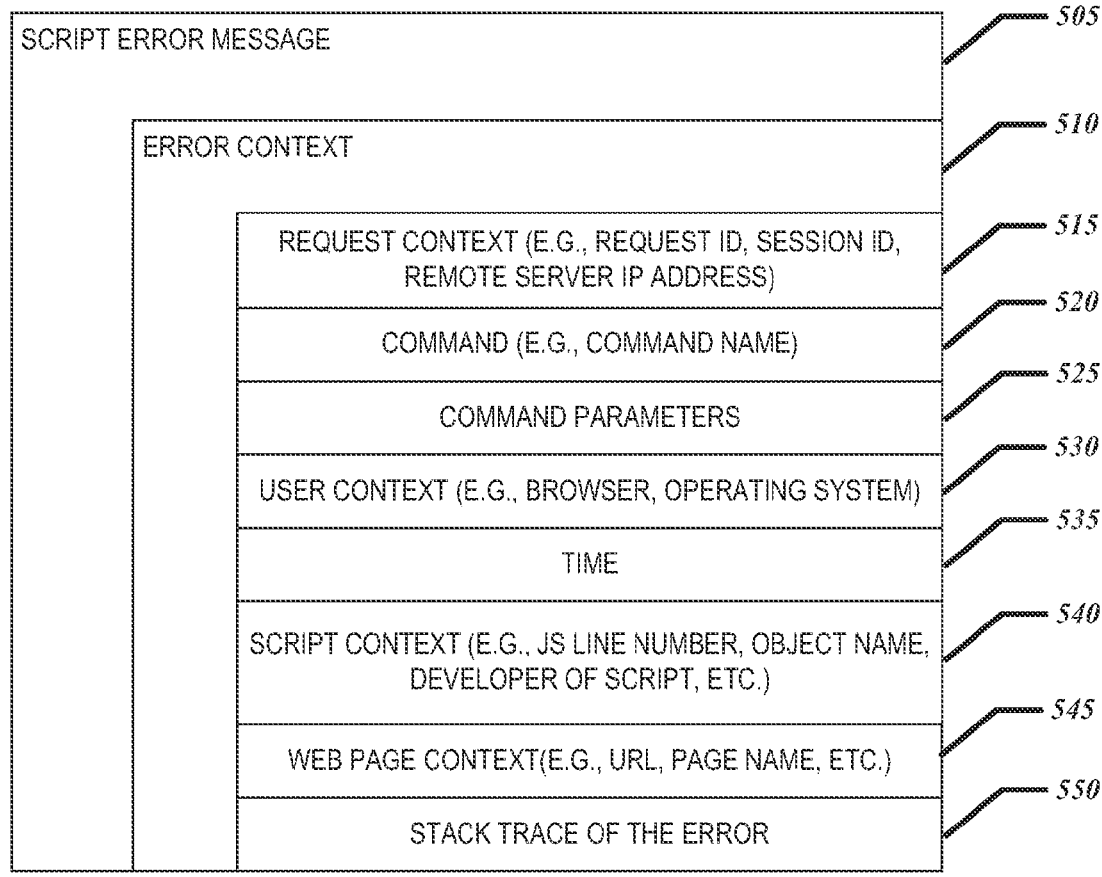
FIG. 5 illustrates example components of an error report according to one embodiment.

FIG. 5 illustrates example components of an error report 500 according to one embodiment. Error report 500 may include a script error message 505. Script error message 505 may be generated at a user terminal 105 in response to an error when a distributed program is run. Scrip error message 505 may include an error context 510. In some examples, the error context 510 may include additional information for a developer to help in resolving the error. The additional information may optionally include one or more of the following: a request context 515, a command 520, command parameters 525, a user context 530, time 535, distributed program (e.g., script) context 540, web page context 545, and one or more stack traces of the error 550.

In some examples, request context 515 may include information associated with the request that resulted in the distribution of the distributed program. Examples could include a request ID, a user session ID, or other information characterizing the original request. This information may be useful in later analyzing whether or not a condition on the content provider computers (e.g., content servers 110) may be responsible for the error.

In some examples, command 520 may simply indicate a Universal Resource Locator ("URL") associated with a web services command. In some examples, command 520 may refer to a web page (other than using a URL) or function or method in the distributed program on which the error occurred. In some examples, command 520 identifies the smallest unit of the distributed program to which the error may be localized.

In some examples, command parameters 525 include the parameters with which command 520 was called. In some examples, command parameters 525 may include field and value pairings, encoded or not, as is common in, for example, HTML GET requests. In some examples, the field corresponds to the name of a parameter and the value corresponds to the value passed to command 520 for the name parameter.

In some examples, user context 530 may include information about user terminal's 105 environment. This information may include, for example, the operating system type and version, the browser type and version, browser plug-ins, other third-party programs, or settings of any or other information that the distributed program may collect about the user terminal's 105 operating environment. In some examples, where the distributed program is JavaScript®, any or all of the environment variables accessible to a JavaScript® program may be captured in the user context 530. In some examples, the distributed program may capture user context 530 without signaling the user of the user terminal 105A in any way. In some examples, user context 530 may include additional information received from a user interface (not shown) presented to a user after the error occurs. The additional information may include one or more questions to help ascertain user activities that the distributed program may not be able to determine on its own. In some examples, user context 530 may be the sole data used by, for example, the presentation facility 225 to automatically create a testing environment, as discussed above.

In some examples, time 535 may include one or more time measurements corresponding to different events associated with the error report 500. For example, time 535 may correspond to the time the error occurred. In some examples, time 535 may also include one or more of: the time the request was made, the time content was delivered to the user terminal 105, the time the error was captured (as opposed to when the error occurred), the time the error information was formatted into the error report 500, and the time the error report 500 was transmitted, among others. In some examples, time 535 is determined by the clock on the user terminal 105. In some examples time 535 is determined from a source external to the user terminal 105, such as by making a remote procedure call. In some examples, time 535 may be computed by adjusting the clock of the user terminal 105 using an external source. In some examples, time 535 may capture any or all of the date, day, month, year, hour, minute, second, and subsequent intervals. Time 535 may provide valuable correlation data to developers working to solve an error. Further, differences in various measurements in time 535 may allow inferences about the speed of the user terminal 105, or other aspects of the user terminal 105 which may provide developers with supplemental information to the user context 530.

In some examples, distributed program (e.g., script) context 540 may be a context for the distributed program. For example, distributed program context 540 may include the version of the distributed program, what developer or development created the distributed program, or how the distributed program is subdivided (libraries, modules, classes, etc.) In some examples, information in distributed program context 540 may be embedded in the distributed program itself. For example, the distributed program may be a JavaScript® program with a header comment identifying the development team responsible for the distributed program. Distributed program context 540 may facilitate rapid assignment of the error report 500 by, for example, the error facility 220 to a developer familiar with the distributed program, thus reducing wasted time and possible errors.

In some examples, web page context 545 may include information about the web page accessed when the error occurred. Such information may include the URL of the web page. In some examples, the information may include the name of the web page. In some examples, the web page may be the referral web page from which the command 520 was invoked.

In some examples, the stack trace of the error 550 may include one or more raw stack traces produced, for example, by a scripting engine executing the distributed program. A stack trace is generally a sequential list of the execution elements beginning with the error (i.e., the execution element such as a method where the error occurred) and ending with the invoking execution element. For example, if a number is divided by zero in method A, a series of library methods (i.e., execution units) may be invoked in an attempt to complete the mathematical operation. One of the library methods, method Z, may then throw an exception (or otherwise indicate the division by zero error) causing a cascade up to the library method that called Z. The cascade continues until method A receives notification of the error. Each method between method Z and A would then be indicated in the stack trace. In some examples, the element of the stack trace corresponding to an execution element may include the line number within the execution element where the error occurred (either initially or within the call path from method A to Z).

FIG. 6 illustrates an example formatted error report 600 according to one embodiment. Error report 600 may be in any format permitting the identification of data with capture fields, such as those shown in FIG. 5. Error report 600 is here shown in a plain text format with a JavaScript® line number and error message 605 in the first line. Following the identification of the JavaScript® error message 605, a "Context" is shown, wherein the context variables are contained within curly braces (e.g., "{") and wherein each capture field has a name separated from its value by a colon, the value proceeding until the end of a line (some lines are wrapped in FIG. 6 merely to illustrate each line completely). Error report 600 is shown to include context capture fields of user environment 610, the URL parameters preceding the error 615, the user terminal's 105 Internet Protocol ("IP") address 620, and the web page name 625 where the error occurred. In some examples, other or additional capture fields may be part of error report's 600 format. In some examples, one or more capture fields may be associated, or correlated, with broader data classifications. For example, fields 610 and 620 may both be a part of user context 530, and field 615 may be part of any or all of request context 515, command 520, and command parameters 525.

In some examples, any or all of the data contained within either error report 500 or 600 may be viewed by a service user through a graphical user interface generated by the presentation facility 225. In some examples, the graphical user interface may provide for a drill down functionality as shown above in user interface 400.

Figure 7:
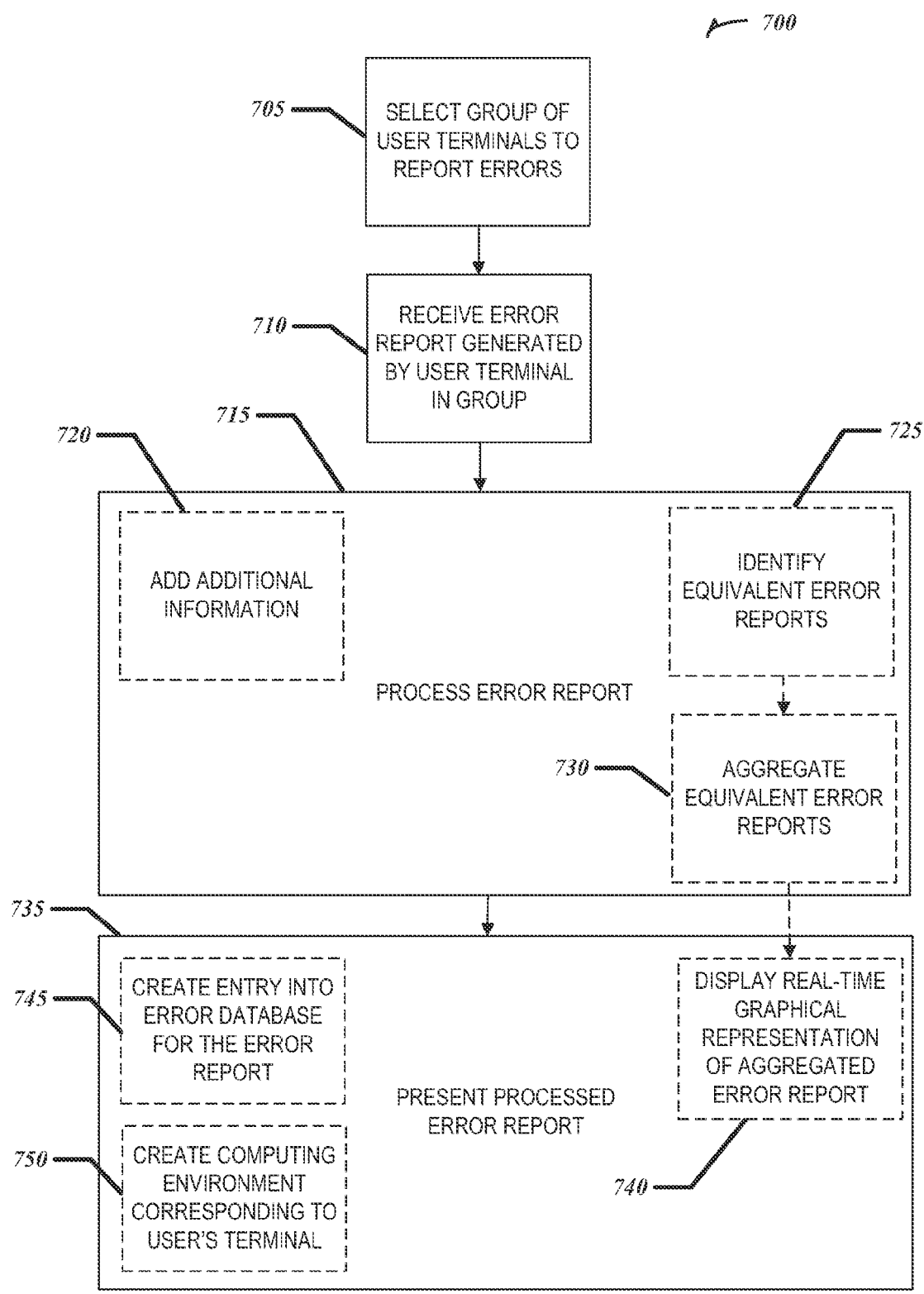
FIG. 7 illustrates a flowchart of an example method for high-volume distributed script error handling.

FIG. 7 illustrates a flowchart of an example method 700 for high-volume distributed script error handling according to one embodiment. In some examples, one or more components shown in FIGS. 1-6 may be used to practice method 700, but the practice of method 700 is not limited to these components.

At 705 a group of user terminals 210 are selected to report errors. The group of user terminals 210 being a subset of user terminals having open user sessions 205 and the group of user terminals 210 being smaller than a threshold value. In some examples, the threshold value may be set such that the computing resources designated by the content provider to receive error reports 125 may service the simultaneous reporting of an error by every user terminal 105 in the group of user terminals 210. For example, if the content provider provides a single computer that has resources to receive ten simultaneous error report 125 submissions, the threshold value may be set at ten. It will be understood that the threshold value is a mechanism for the content provider to control the resource demands of an error reporting system (e.g., system 100). In this way, a content provider may make use of remote error reporting in high-volume, distributed programs.

In some examples, using statistical sampling methods to select the group of user terminals 210 may include selecting the group of user terminals 210 to be a statistical sample. A statistical sample may be understood to be a subset of a population that can be used in various statistical analyses to arrive at statistical inferences. For example, given a population (e.g., all user terminals with open user sessions 205), the statistical sample may be a subset of the population (e.g., the group of user terminals 210) from which one may make inferences or extrapolations about the population. The size and selection of the members of the sample vary according to the statistical methods used. In some examples the user terminals 105A and 105B may be chosen randomly from all user terminals with open user sessions 205. In some examples, the size may be determined based on known statistical methods to yield a particular power for a test, as long as the sample size is below the predetermined threshold value previously discussed. For example, for a population greater than ten thousand, a sample size of one thousand will yield a confidence level of ±5%. Thus, if the predetermined threshold is ten thousand, but a desired confidence level of 5% is desired, then the group of user terminals 210 may have a cardinality of one thousand. By limiting the absolute cardinality of the group of user terminals 210 to be equal to or less than the predetermined threshold value, a content provider may control the resources needed to process error reports. However, in some cases the group of user terminals 210 may be even smaller than the predetermined threshold value depending upon the statistical sampling method and confidence level used, thus freeing some of the error processing resources to be used for other tasks. In some examples, the statistical sample is designed to provide a particular confidence level (e.g., 95%) that each type of user terminal 105 environment is represented in the group of user terminals 210. In some examples, when the predetermined threshold value and a statistical sample size for a given confidence level are in conflict, the conflict is resolved in favor of the predetermined threshold value. For example, if to achieve 95% confidence level that every user environment is represented in the group of user terminals 210, a sample size of one hundred is needed, and the predetermined threshold size is ten, then the cardinality of the group of user terminals 210 will be ten. However, in these circumstances, data may be stored indicating the confidence level of the sample. That is, the group of user terminals 210 may still be considered a statistical sample with a reduced level of confidence, the level of confidence computed and stored for later reference.

In some examples, the group of user terminals 210 may be selected by a designated service, such as error facility 220, content server 110, or logging server 120, of the content provider. In some examples, the group of user terminals 210 may be selected by the content server 110 or some other piece of software or hardware with access to the content being distributed. In some examples, the distributed program is modified to include error reporting code when it is being distributed to a user terminal 105. In some examples, the distributed program already includes the error reporting code and is activated via a switch or command parameter, etc., when it is distributed to a user terminal 105A in the group of user terminals 210.

At 710 an error report 125 may be received, the error report 125 being generated by a user terminal 105A in response to a distributed program (e.g., script) error, the user terminal 105A being in the group of user terminals 210. In some examples the error report 125 may contain some or all of the information in either error report 500 or 600. In some examples, the error report 125 may be formatted, such as is shown in FIG. 5 or 6. In some examples, the error report 125 may be received at the same service that selected the group of user terminals 210, such as the error facility 220. In some examples, the error report 125 may be received at a different service, or set of machines, such as at the logging server 120.

At 715 the error report 125 received at 710 may be processed to create a processed error report. In some examples, the processed error report may retain all of the information contained within the error report 125. In some examples, some information from the error report 125 may be modified or removed in the processed error report. It will be understood that creating the processed error report may entail transforming data stored in system memory (e.g., random access memory, etc.), on system storage (e.g., a hard drive, Flash memory, read-only memory, etc.), or in other computer components that may represent the error report 125. It will also be understood that hardware components of a computer (e.g., processors, system memory, and storage) are used to create the processed error report. That is, creating the processed error report is tied to specific hardware components (e.g., a processor) of the one or more computers performing method 700.

At 720 further processing the error report 125 at 715 may optionally include adding information associated with the error report 125, for example, to the processed error report. The information may be unavailable to the user terminal 105A. For example, the open user session belonging to the user terminal 105A may contain server state information that is not available to the distributed program, or error capturing facility of the user terminal 105A; that server state information may then be added to the error report 125. A more complete context for the error may be created by adding this additional information and thus it may help a developer to quickly correct the error.

At 725 further processing the error report 125 processed at 715 may optionally include identifying equivalent error reports, the equivalent error reports being equal to the error report 125 in at least one measure. In some examples, the equality may be the error type, some environmental variable from the user terminal 105A (e.g., the operating system and version), or any other metric contained within the error report 125. In some examples, two or more measures must be equal between the error report 125 and other received error reports to determined equivalence.

At 730 the processed error report may optionally be aggregated with the equivalent error reports identified at 725 to create an aggregated error report. In some examples, the aggregated error report may include all of the data, or references to the data, of each constituent error report 125. In some examples, only a subset of the data in the constituent error reports is retained in the aggregated error report. In some examples, to save storage space or computing resources, the constituent error reports may be destroyed (deleted or not stored) upon creation of the aggregated error report. In some examples, a predefined subset of capture fields (e.g., such as 515-540 shown in FIG. 5) may be aggregated. In some examples, additional fields may be included in the aggregated error report, the additional fields not present in any constituent error report 125. An example may be the total number of errors received, or other metric derived from the constituent error reports. It will be understood that the aggregated error report is designed to distill pertinent information from the constituent error reports such that a decision maker a service user of the content provider) may be able to quickly analyze a situation (e.g., incoming error reports 125) and determine appropriate responses.

At 735 the processed error report may be presented to a service user. In some examples, presentation may be graphical through a graphical user interface, alerts, etc.) or it may be non graphical, such as sending an alert via a messaging service (e.g., via email). In some examples the service user may be an employee of the content provider. In some examples, the service user may be a third-party employee or service managing, at least in part, the correction of errors in the distributed program. In some examples, a designated service or computer (e.g., the presentation facility 225) may present the processed error report to the service user. In some examples, a collection of software and hardware may present a portion of the processed error report. For example, a dashboard type application may present some portion of the processed error report along with data unrelated to the processed error report. A service user may then, for example, link from the dashboard application to a togging facility to see details of an individual error report 125. In some examples, a messaging system (e.g., email) may be used to communicate the processed error report to the service user. It will be understood that presenting the processed error report may entail transforming data stored in system memory (e.g., random access memory, etc.), graphical processing unit ("CPU") memory, display buffers, on system storage a hard drive, Flash memory, read-only memory, etc.), or in other computer components that may represent a portion of the graphical, or informational, presentation of the processed error report. It will also be understood that hardware components of a computer (e.g., processors, system memory, and storage) are used to present the processed error report. That is, presenting the processed error report is tied to specific hardware components (e.g., a processor) of the one or more computers performing 735 specifically or method 700 generally.

At 740 presenting the processed error report to the service user may optionally include displaying a real-time graphical representation of the aggregated error report created at 730. A real-time representation of the aggregated error report may facilitate human decision makers In some examples, the graphical representation may also include the ability to look at error reports 125 over a period of time (e.g., between 9:00 AM and 10:00 AM on a given day). In some examples, the graphical representation may be a graph, such as plot 305. In some examples, the graphical representation may include various colors, such as red, to indicate a problem. In some examples, an alarm threshold may be defined such that the graphical representation is changed, appears, or disappears in relation to information in the aggregated error report. For example, an alarm threshold may be defined such that a red alarm graphic is presented on a dashboard interface when a rate of error (more than one error in one hundred content servings) exceeds the threshold (e.g., one error in fifty content servings). In some examples, the graphical representation may include user interface elements allowing the service user to view more detailed information, such as that shown in user interface 400. Presenting the real-time graphical representation of the aggregated error report may provide a service user with the most pertinent information in making timely decisions that may impact user experience. For example, if the content provider just released a new version of a distributed program, and an immediate and significant rise in remotely reported errors is received, the service user may be able to quickly ascertain that rolling back the new version of the distributed program to the previous version would be the most effective solution to maintain a desired level of user experience. However, if the rate of received error reports 125 is significant, and yet not overwhelming, then the service provider may determine that the new version should remain—perhaps considering other factors such as increased content provider revenue due to the new version—and that developers should begin immediate work on fixing the error.

At 745 presenting the processed error report to the service user may optionally include creating an entry (e.g., a bug report) in an error database for the processed error report. In some examples, the entry may include some or all of the information in the processed error report. Generally, the bug report will contain enough information to allow a developer to diagnose the cause(s) of the error and test the solution. In some examples, once the bug report is created, a process may assign the responsibility to solve the error to one or more developers.

In some examples, the entry into the error database may optionally include an assignment to a developer, or group of developers, to correct the error associated with the processed error report. In some examples, the assignment is made with information in the processed error report. For example, if the distributed program included the developer or development team responsible for programming the distributed program, this information may be captured in the error report 125 and used to assign the entry to the same developer or development team. In some examples, the type of error indicated in the processed error report may be matched against a database, for example, of developers responsible for fixing that type of error. In some examples, creating the entry may provoke notifications (e.g., emails or other alerts) to stake holders e.g., the head of a development team). Automating the entry of the bug report may allow developers to find a solution to the error more quickly. Further, the automated entry of bug reports may mitigate mishandling or mismanagement of data by intermediaries (e.g., help desk, or first-tier support personal) in the process.

At 750 presenting the processed error report to the service user may optionally include automated creation of a computing environment corresponding to the environment on the user terminal 105A. In some examples, a service, such as the presentation facility 225, may extract environment information (e.g., operating system and version, browser, plug-ins, etc.) about the user terminal 105A. This environment information may then be used to locate a testing system which most closely matches the environment of the user terminal 105A and reserve the environment to aid in solving the error. In some examples, the service may utilize a library of environmental components, and create, or direct the creation of, an environment which closely matches the environment on the user terminal 105A. For example, the presentation facility 225 may interface with a virtual machine provisioning system and direct the instantiation of a virtual machine with the same or similar operating system, browser, environmental settings, among other things, as the user terminal 105A. In some examples, the service may create a test plan, including the environment in which the test plan is to be executed. By automating the creation of the diagnostic and testing environment for developers, time may be saved. Moreover, automatic creation of the testing environment may save the content provider money by removing the need for an employee to manually set up the environment. Further, errors in creating the testing environment may be mitigated.

Figure 8:
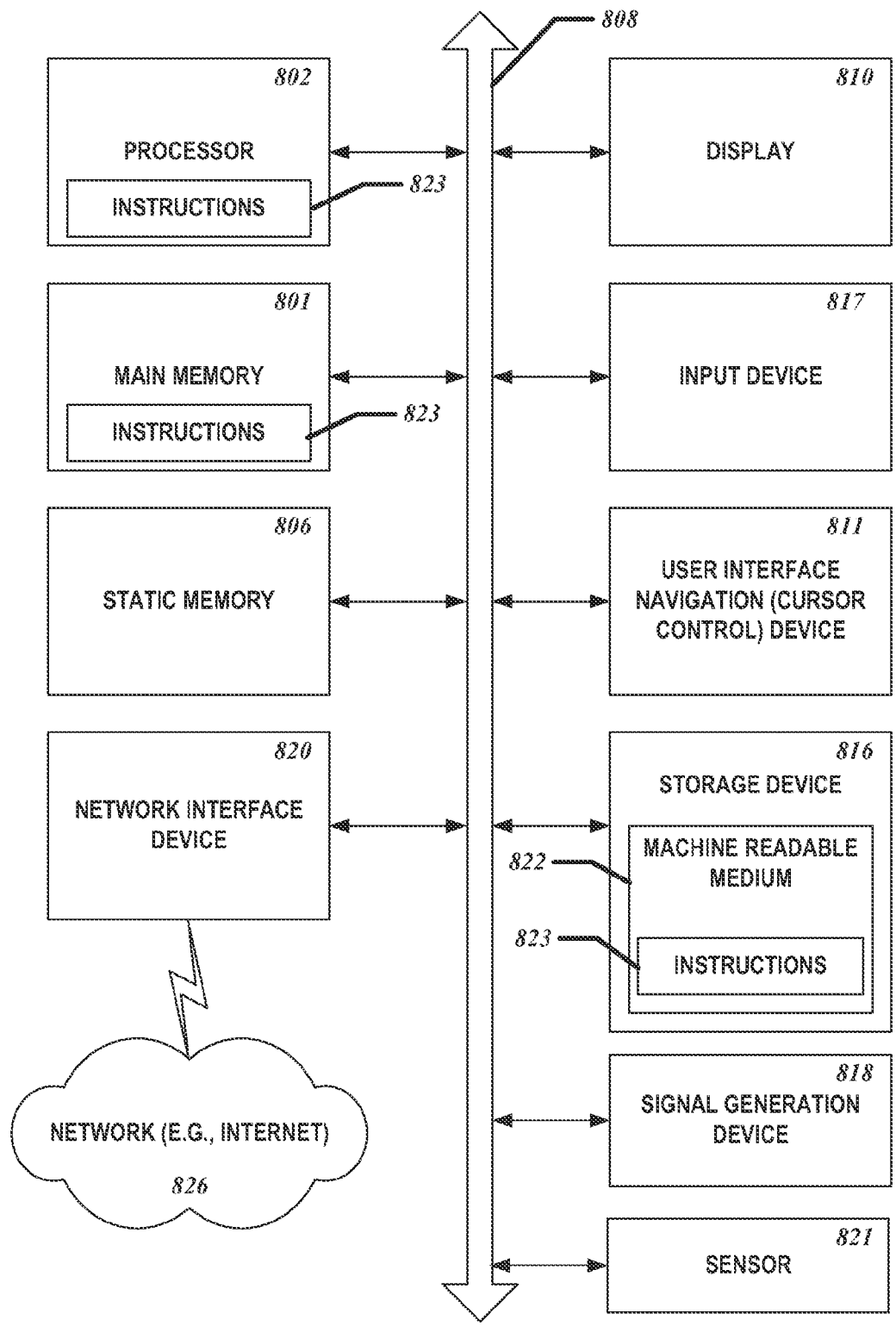
FIG. 8 illustrates a block diagram of an example machine upon which any one or more of the methodologies discussed may be run.

FIG. 8 is a block diagram illustrating an example machine upon which any one or more of the methodologies herein discussed may be run. In alternative embodiments, the machine operates as a standalone device or may be connected (e.g., networked) to other machines. In a networked deployment, the machine may operate in the capacity of either a server or a client machine in server client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 800 includes a processor 802 (e.g., a central processing unit (CPU), a graphics processing unit (GPU) or both), a main memory 801 and a static memory 806, which communicate with each other via, a bus 808. The computer system 800 may further include a display unit 811), an alphanumeric input device 817 (e.g., a keyboard), and a user interface (UI) navigation device 811 (e.g., a mouse). In one embodiment, the display, input device and cursor control device are a touch screen display. The computer system 800 may additionally include a storage device (e.g., drive unit) 816, a signal generation device 818 (e.g., a speaker), a network interface device 820, and one or more sensors 821, such as a global positioning system sensor, compass, accelerometer, or other sensor.

The storage device 816 includes a machine-readable medium 822 on which is stored one or more sets of data structures and instructions 823 software) embodying or utilized by any one or more of the methodologies or functions described herein. The instructions 823 may also reside, completely or at least partially, within the main memory 801 and/or within the processor 802 during execution thereof by the computer system 800, the main memory 801 and the processor 802 also constituting, machine-readable media.

While the machine-readable medium 821 is illustrated in an example embodiment to be a single medium, the term "machine-readable medium" may include a single medium or multiple media (e.g., a centralized or distributed database, and/or associated caches and servers) that store the one or more instructions 823. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Electrically Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 823 may further be transmitted or received over a communications network 826 using a transmission medium via the network interface device 820 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax®, networks). The term "transmission medium" shall be taken to include any intangible medium that is capable of storing, encoding or carrying instructions for execution by the machine, and includes digital or analog communications signals or other intangible medium to facilitate communication of such software.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other examples or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a tangible computer-readable medium or tangible machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method comprising:
    selecting, using one or more processors, a group of user terminals to report errors, the group of user terminals being a subset of user terminals having open user sessions and the group of user terminals being smaller than a predetermined threshold value;
    receiving an error report, the error report being generated by a user terminal in response to a script error, the user terminal being within the group of user terminals;
    processing the error report to create a processed error report; and
    presenting the processed error report to a service user.

2. The method of claim 1, wherein processing the error report includes adding information associated with the error report, the information being unavailable to the user terminal.

3. The method of claim 1, wherein processing the error report includes identifying equivalent error reports.

4. The method of claim 3, wherein the processed error report is aggregated with the equivalent error reports to create an aggregated error report.

5. The method of claim 4, wherein presenting the processed error report to the service user includes displaying a real-time graphical representation of the aggregated error report.

6. The method of claim 1, wherein presenting the processed error report to the service user includes creating an entry into an error database for the processed error report.

7. The method of claim 6, wherein the entry into the error database includes an assignment to a developer to correct an error associated with the processed error report.

8. The method of claim 1, wherein presenting the processed error report to the service user includes an automated creation of a computing environment corresponding to an environment of the user terminal.

9. The method of claim 1, wherein selecting the group of user terminals to report errors includes choosing representative user terminal environments from the user terminals having open user sessions using statistical sampling methods.

10. A system comprising:
    a processor;
    an error facility that executes on the processor, the error facility configured to:
        select a group of user terminals to report errors, the group of user terminals being a subset of user terminals having open user sessions and the group of user terminals being smaller than a predetermined threshold value;
        receive an error report generated by a user terminal in response to a script error, the user terminal being within the group of user terminals; and
        process the error report to create a processed error report; and
    a presentation facility configured to present the processed error report to a service user.

11. The system of claim 10, wherein to process the error report includes adding information associated with the error report, the information being unavailable to the user terminal.

12. The system of claim 10, wherein to process the error report includes identifying equivalent error reports.

13. The system of claim 12, wherein the processed error report is aggregated with the equivalent error reports to create an aggregated error report.

14. The system of claim 13, wherein to present the processed error report to the service user includes displaying a real-time graphical representation of the aggregated error report.

15. The system of claim 10, wherein to present the processed error report to the service user includes creating an entry into an error database for the processed error report.

16. The system of claim 15, wherein the entry into the error database includes an assignment to a developer to correct an error associated with the processed error report.

17. The system of claim 10, wherein to present the processed error report to the service user includes an automated creation of a computing environment corresponding to an environment of the user terminal.

18. The system of claim 10, wherein to select the group of user terminals to report errors includes using statistical sampling methods to choose representative user terminal environments from the user terminals having open user sessions.

19. A non-transitory machine-readable medium storing instructions that, when executed by at least one processor, cause the at least one processor to perform the following actions:
    selecting a group of user terminals to report errors, the group of user terminals being a subset of user terminals having open user sessions and the group of user terminals being smaller than a predetermined threshold value;
    receiving an error report, the error report being generated by a user terminal in response to a script error, the user terminal being within the group of user terminals;

processing the error report to create a processed error report; and presenting the processed error report to a service user.

\* \* \* \* \*